(12) United States Patent
Schriefer

(10) Patent No.: US 10,425,518 B2
(45) Date of Patent: *Sep. 24, 2019

(54) TELEPHONE SYSTEM FOR IMPAIRED INDIVIDUALS

(71) Applicant: teleCalm, Inc., Dallas, TX (US)

(72) Inventor: Tavis Dion Schriefer, Carrollton, TX (US)

(73) Assignee: TeleCalm, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/589,143

(22) Filed: May 8, 2017

(65) Prior Publication Data

US 2017/0244820 A1 Aug. 24, 2017

Related U.S. Application Data

(63) Continuation of application No. 15/200,337, filed on Jul. 1, 2016, now Pat. No. 9,686,392.

(Continued)

(51) Int. Cl.
*H04M 1/247* (2006.01)
*H04W 4/20* (2018.01)
(Continued)

(52) U.S. Cl.
CPC ...... *H04M 1/2474* (2013.01); *G06Q 10/1091* (2013.01); *G08B 21/0461* (2013.01); *G08B 25/10* (2013.01); *H04L 67/02* (2013.01); *H04L 67/22* (2013.01); *H04M 1/0202* (2013.01); *H04M 1/03* (2013.01); *H04M 1/2477* (2013.01); *H04M 1/27455* (2013.01); *H04M 1/575* (2013.01); *H04M 1/605* (2013.01);

(Continued)

(58) Field of Classification Search
CPC combination set(s) only.
See application file for complete search history.

(56) References Cited

U.S. PATENT DOCUMENTS

| 5,224,151 A | 6/1993 | Bowen et al. |
| 5,600,709 A | 2/1997 | Hoflinger |

(Continued)

FOREIGN PATENT DOCUMENTS

| GB | 2400817 A | 10/2004 |
| JP | 2008092256 A | 4/2008 |

OTHER PUBLICATIONS

"PCT Search Report," PCT patent application serial No. PCT/US16/40834, filed Jul. 1, 2016, 5 pages.

(Continued)

*Primary Examiner* — Phung-Hoang J Nguyen
(74) *Attorney, Agent, or Firm* — Kirby Drake

(57) ABSTRACT

An expandable or all-in-one telephone system is designed for seniors suffering from Alzheimer's and other forms of dementia as well as other cognitively challenged individuals. The features and settings are managed by their caregivers through a web browser or a smartphone application. This phone system provides caregivers with peace of mind and care-receivers with an easy-to-use safe system customized to fit their individual abilities and adaptable as their needs change. Accordingly, the system may help seniors retain dignity and independence, while reducing daily stress points for caregivers.

14 Claims, 2 Drawing Sheets

Related U.S. Application Data

(60) Provisional application No. 62/218,874, filed on Sep. 15, 2015, provisional application No. 62/188,574, filed on Jul. 3, 2015.

(51) Int. Cl.

| | | |
|---|---|---|
| *H04L 29/08* | (2006.01) | |
| *H04M 1/02* | (2006.01) | |
| *H04M 1/03* | (2006.01) | |
| *H04M 1/2745* | (2006.01) | |
| *H04M 1/725* | (2006.01) | |
| *H04M 1/60* | (2006.01) | |
| *H04M 1/57* | (2006.01) | |
| *G08B 21/04* | (2006.01) | |
| *G06Q 10/10* | (2012.01) | |
| *G08B 25/10* | (2006.01) | |
| *H04M 3/42* | (2006.01) | |
| *H04M 3/533* | (2006.01) | |
| *H04M 1/05* | (2006.01) | |

(52) U.S. Cl.
CPC ... *H04M 1/72538* (2013.01); *H04M 1/72577* (2013.01); *H04M 3/42391* (2013.01); *H04W 4/20* (2013.01); *H04L 67/10* (2013.01); *H04M 1/05* (2013.01); *H04M 1/72541* (2013.01); *H04M 3/53333* (2013.01); *H04M 2201/38* (2013.01); *H04M 2203/255* (2013.01); *H04M 2250/12* (2013.01); *H04M 2250/20* (2013.01); *H04M 2250/22* (2013.01); *H04M 2250/52* (2013.01)

(56) References Cited

U.S. PATENT DOCUMENTS

| | | |
|---|---|---|
| 5,710,810 A | 1/1998 | Tiilikainen |
| 5,996,518 A | 12/1999 | Tomita |
| 6,072,868 A | 6/2000 | Irvin |
| 6,212,271 B1 | 4/2001 | Hughes et al. |
| 6,411,828 B1 | 6/2002 | Lands et al. |
| 6,667,738 B2 | 12/2003 | Murphy |
| 6,993,366 B2 | 1/2006 | Kim |
| 7,321,781 B2 | 1/2008 | Sorotzkin |
| 7,697,962 B2 | 4/2010 | Cradick et al. |
| 7,983,718 B1 | 7/2011 | Roka |
| 8,223,947 B2 | 7/2012 | Hua et al. |
| 8,243,961 B1 | 8/2012 | Morrill |
| 8,254,984 B2 | 8/2012 | Kerr |
| 8,537,990 B2 | 9/2013 | Rudman |
| 8,676,224 B2 | 3/2014 | Louch |
| 8,903,371 B2 | 12/2014 | Dossas et al. |
| 9,002,399 B2 | 4/2015 | Eichen et al. |
| 9,135,466 B2 * | 9/2015 | Okvist ............... A61B 5/00 |
| 9,300,777 B2 | 3/2016 | Bonde |
| 2003/0144034 A1 | 7/2003 | Hack et al. |
| 2005/0036663 A1 * | 2/2005 | Caspi ............... H04L 63/0861 |
| | | 382/124 |
| 2005/0129185 A1 | 6/2005 | McClelland et al. |
| 2005/0239496 A1 | 10/2005 | Sylvain |
| 2006/0079269 A1 | 4/2006 | Sorotzkin |
| 2007/0036348 A1 | 2/2007 | Orr |
| 2007/0091380 A1 | 4/2007 | Mitchell et al. |
| 2007/0265032 A1 | 11/2007 | Aisenberg |
| 2008/0005301 A1 | 1/2008 | Li et al. |
| 2008/0146289 A1 | 6/2008 | Komeluk et al. |
| 2009/0040947 A1 * | 2/2009 | Krivopaltsev ...... H04L 41/0213 |
| | | 370/255 |
| 2009/0060170 A1 | 3/2009 | Coughlan et al. |
| 2009/0153489 A1 * | 6/2009 | Murakami ............ G06F 3/0202 |
| | | 345/168 |
| 2009/0201256 A1 * | 8/2009 | Jeong ..................... G06F 3/042 |
| | | 345/173 |
| 2010/0008523 A1 | 1/2010 | Demuynck et al. |
| 2011/0305331 A1 * | 12/2011 | Hughes ................. H04M 7/003 |
| | | 379/202.01 |
| 2012/0108233 A1 | 5/2012 | Meitzler et al. |
| 2012/0128143 A1 * | 5/2012 | Rudman ............. H04M 1/2474 |
| | | 379/110.01 |
| 2012/0303404 A1 | 11/2012 | Nudd |
| 2013/0045728 A1 | 2/2013 | Iverson et al. |
| 2013/0047114 A1 * | 2/2013 | Murakami ............ G06F 3/0486 |
| | | 715/773 |
| 2013/0237281 A1 * | 9/2013 | Murphy ............... H04M 1/0202 |
| | | 455/556.1 |
| 2013/0276143 A1 * | 10/2013 | Okvist ..................... A61B 5/00 |
| | | 726/28 |
| 2013/0307780 A1 | 11/2013 | Todora et al. |
| 2013/0343585 A1 | 12/2013 | Bennett et al. |
| 2014/0162609 A1 | 6/2014 | Chien |
| 2014/0267712 A1 | 9/2014 | Foerster et al. |
| 2014/0327540 A1 | 11/2014 | Shin et al. |
| 2015/0024717 A1 * | 1/2015 | Kochhar ................. H04W 4/16 |
| | | 455/413 |
| 2015/0087258 A1 * | 3/2015 | Barnes ..................... H04W 4/22 |
| | | 455/404.2 |
| 2015/0099946 A1 | 4/2015 | Sahin |
| 2015/0304471 A1 | 10/2015 | Frandsen |
| 2016/0105557 A1 | 4/2016 | van der Raadt et al. |
| 2016/0154512 A1 | 6/2016 | Won |
| 2016/0267712 A1 | 9/2016 | Nartker et al. |
| 2016/0271928 A1 | 9/2016 | Luo et al. |
| 2016/0291703 A1 | 10/2016 | Tokutake |
| 2016/0302174 A1 | 10/2016 | Chatterjee et al. |
| 2016/0325143 A1 | 11/2016 | Yuen et al. |
| 2016/0358065 A1 | 12/2016 | Gedge et al. |
| 2017/0013334 A1 | 1/2017 | Hidaka et al. |
| 2017/0070611 A1 * | 3/2017 | Silver ..................... H04M 3/02 |

OTHER PUBLICATIONS

"Written Opinion," PCT patent application serial No. PCT/US16/40834, filed Jul. 1, 2016, 11 pages.

* cited by examiner

TELEPHONE SYSTEM FOR IMPAIRED INDIVIDUALS

CROSS REFERENCE TO RELATED APPLICATIONS

This application claims the benefit under 35 U.S.C. § 119(e) of U.S. Non-Provisional patent application Ser. No. 15/200,337 filed on Jul. 1, 2016, entitled "Telephone System for Impaired Individuals," U.S. Provisional Patent Application Ser. No. 62/188,574 filed on Jul. 3, 2015, entitled "Phone System for Memory Impaired," and U.S. Provisional Patent Application Ser. No. 62/218,874 filed on Sep. 15, 2015, entitled "Telephone System for Memory Impaired," both of which are incorporated by reference in their entirety.

FIELD OF THE DISCLOSURE

The present disclosure generally relates to telephone systems, and more particularly to telephone systems for the impaired user.

BACKGROUND

There is a large segment of the population over 65 years old that still live independently but may need some degree of care, monitoring and/or assistance in doing so. Caregivers, which may be family members or professionals, may not reside with the aging individual but need ways to monitor the individual when not physically present.

There are devices available to monitor aging individuals, particularly those with some memory and/or health issues. These devices, however, may require adaptation on the part of the aging individual either in the form of behavioral changes or in the form of modifications to the individual's home. It can be a challenge to introduce technology into the individual's home without creating an adverse reaction, and thus, there remains a need for technology that may monitor activities, such as phone use, with a minimal level of obtrusiveness.

SUMMARY

Embodiments of the present disclosure may provide a telephone system for a caregiver to manage an impaired individual, the system comprising at least one desk phone associated with the impaired individual, the at least one desk phone having an uncluttered interface to simplify use of the at least one desk phone by the impaired individual, and at least one caregiver monitoring application that may selectively identify one or more functionalities for the at least one desk phone, wherein the at least one desk phone and the at least one caregiver monitoring application may communicate over a cloud service. The at least one caregiver monitoring application may be a web application or a smartphone application. The at least one desk phone may include sensors and cameras, the sensors selected from the group comprising an accelerometer, orientation and motion sensors, infrared and other heat sensors, galvanic skin response sensors, heartbeat sensors and light sensors. The at least one desk phone may include a wireless handset, and the wireless handset may include a tether. Each end of the wireless handset may have an earpiece speaker and a microphone. The wireless handset may include at least one sensor to determine which end is closest to the impaired individual's ear to activate the proper speaker and microphone combination. The at least one sensor may be placed on a grip of the wireless handset to sense if the wireless handset is being held in a hand of the impaired individual, and wherein the at least one sensor may be on a top portion of the wireless handset, the bottom portion of the wireless handset, or both. The at least one desk phone may include a large display. The large display may include a plurality of transparent buttons associated with switches. Alternatively, the large display may include a cover plate and a plurality of transparent buttons overlaid on the large display, the plurality of transparent buttons having an undersurface conducive to interaction with a touch panel of the large display when depressed. The large display may include at least one quick-dial button, wherein the at least one quick-dial button may be associated with at least one phone number and display a photo or text associated with the at least one phone number. The large display may include an information section, wherein the information section may digitally display an identification of a caller, time of call, and one or more items of additional information. The at least one desk phone may include one or more sensors to monitor activities within a defined perimeter of the at least one desk phone and report the activities to the cloud service. The at least one desk phone may include a wireless communication technology that may transform the at least one desk phone into a hub to interface with one or more devices within a defined perimeter of the at least one desk phone. The one or more devices may be selected from the group comprising: fall detector/emergency pendants and wristbands, GPS tracking devices, activity/heart monitors, medication monitors, video/audio monitors, motion detectors, light controls, electronic or wireless-enabled door locks, house lighting, bed monitors, cameras, motion sensors, scales, heartbeat sensors, galvanic skin response sensors, and blood pressure monitors. The cloud service may contain a set of rules, database lists and available user features that both provide and limit functionality of the at least one desk phone in a customized manner to match physical and mental capabilities of the impaired individual. The at least one desk and the at least one caregiver application may communicate over the cloud service through one or more of the following: a cellular network, a Wi-Fi network, a Bluetooth connection, and a wired connection.

Other embodiments of the present disclosure may provide a wireless handset for use with a communication device of a communication system of an individual, the wireless handset comprising a first end having a first earpiece speaker and a first microphone, a second end having a second earpiece speaker and a second microphone, and at least one sensor that may determine whether the first end or the second end is closer to the individual's ear when the individual picks up the wireless handset and activate the first earpiece speaker and the second microphone when the first end is closer to the individual's ear and activate the second earpiece speaker and the first microphone when the second end is closer to the individual's ear. The wireless handset also may include a plurality of sensors that measure and collect handset location and position and health-related and activity data about the individual and transmit the data to a cloud service for evaluation by a third party or caregiver. The plurality of sensors may be selected from the group comprising an accelerometer, orientation and motion sensors, infrared and other heat sensors, galvanic skin response sensors, heartbeat sensors, and light sensors. The wireless handset may further comprise at least one speaker on a backside of the wireless handset, wherein the at least one speaker may be activated when the handset is away from the individual's face. The at least one speaker may transform the wireless handset into a speaker phone and/or may play music wirelessly from a base unit of the desk phone.

Further embodiments of the present disclosure may provide a method of using a telephone system for a caregiver to remotely manage an impaired individual, the method comprising connecting at least one desk phone associated with the impaired individual with at least one caregiver monitoring application that may selectively identify one or more functionalities for the at least one desk phone, and transmitting data between the at least one desk phone and the at least one caregiver monitoring application over a cloud service containing a set of rules, database lists and available user features that may be defined and updated by the caregiver monitoring application to provide and limit functionality of the at least one desk phone in a customized manner to match physical and mental capabilities of the impaired individual. Data may include health-related and activity data about the impaired individual that may be transmitted to the cloud service for evaluation by a caregiver or trusted party, or other authorized personnel and wherein the health-related and activity data may be measured and collected by a plurality of sensors associated with the at least one desk phone. The method may further comprise interfacing the at least one desk phone with one or more devices within a defined perimeter of the at least one desk phone, the one or more devices selected from the group comprising: fall detector/emergency pendants, activity/heart monitors, medication monitors, video/audio monitors, motion detectors, light controls, electronic or wireless-enabled door locks, house lighting, bed monitors, cameras, motion sensors, scales, and blood pressure monitors, and transmitting data collected from the one or more devices to the cloud service or other trusted party. The one or more functionalities for the at least one desk phone may be selected from the group comprising: approved phone numbers, blocked phone numbers, times for when calls can be placed and received, rules for incoming calls from approved and unknown callers, rules for outgoing calls to approved and unknown callers, rules for repeated dialing, voicemail, and overrides of calling rules. The at least one desk phone may include a display that displays a caller ID name and number, a display name, or both when the impaired individual receives a call. Partial phone numbers or old phone numbers may cross-reference to a contact when the impaired individual attempts to dial an approved phone number. The at least one desk phone may include a handset having volume control, volume leveling, sound amplifier, and/or active noise reduction, but these functionalities also may be controlled via the cloud service. Attempts may be made to deliver a voicemail to the impaired individual by periodically ringing the at least one desk phone and then playing the voicemail when the at least one desk phone is answered. Data transmitted between the at least one desk phone and the at least one caregiver monitoring application may include the functionality for a paid caregiver to clock-in and clock-out when he/she arrives or leaves the impaired individual, and upon clocking-in or clocking-out, a notification may be sent to a family caregiver and the paid caregiver's employer. The paid caregiver may clock-in and clock-out by entering a code on a keypad of the at least one desk phone. The paid caregiver may clock-in and clock-out by calling a specified phone number and entering a code.

Additional embodiments of the present disclosure may provide a telephone system for a caregiver to manage an impaired individual comprising at least one desk phone associated with the impaired individual, the at least one desk phone having an uncluttered interface to simplify use of the at least one desk phone by the impaired individual, and at least one caregiver monitoring application that may selectively identify one or more functionalities for the at least one desk phone, wherein the at least one desk phone and the at least one caregiver monitoring application may communicate directly with one another.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Embodiments of the present disclosure are primarily designed to solve various phone-related challenges for individuals suffering from memory impairment including, but not limited to, making phone calls (to caregiver and others) during inappropriate times, such as in the middle of the night, receiving unsolicited sales and scam calls resulting in confusion, distress and financial issues, placing calls to doctors and others resulting in issues for caregiver, placing repeated calls to family members and others due to memory loss, forgetting phone numbers of important family and friends, confusion over phone usage, features, and similarities with other devices such as TV remotes, as well as safety concerns with corded landline phones.

Figure 1:
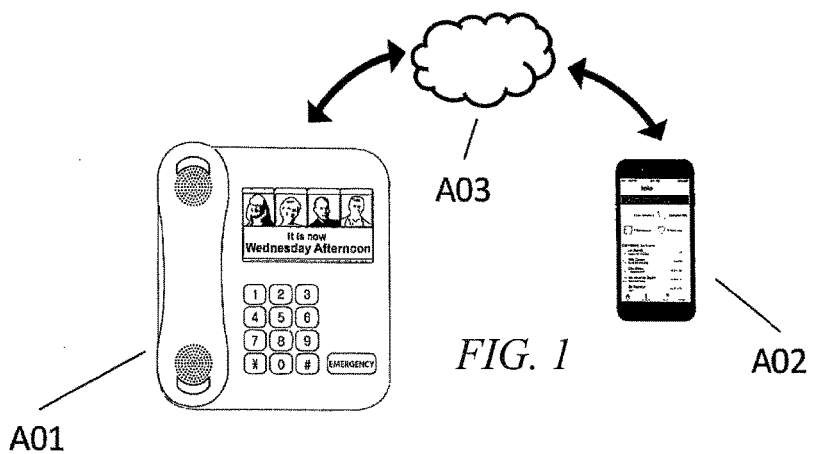
FIG. 1 depicts a telephone system according to an embodiment of the present disclosure.

A phone system according to embodiments of the present disclosure may include at least one desk phone (FIG. 1) [A01] for the care-receiver (desk phone user) interfacing with at least one browser interface (i.e., a web application) and/or a smartphone application (FIG. 1) [A02] for the caregiver, all of which communicate information between/among one another either directly or through a service provider (i.e., a cloud service) (FIG. 1) [A03]. The desk phone may operate on one more communication networks including, but not limited to, a cellular network, a Wi-Fi network and/or through a wired connection. In an embodiment of the present disclosure, the desk phone may operate on the cellular network so that the desk phone may be easily moved from one location to another by unplugging the phone from the power source and plugging the desk phone into another power source at the new location.

In embodiments of the present disclosure, using a browser interface and/or smartphone application, the caregiver may configure and control a set of rules, database lists and available user features on the desk phone. The caregiver may access these features from anywhere in the world, and updates may be communicated to the desk phone.

The caregiver may interact with the desk phone (FIG. 1) [A01] using the caregiver application (FIG. 1) [A02] which may communicate with the cloud service (FIG. 1) [A03] according to embodiments of the present disclosure. This may allow the caregiver to access all desk phone settings and view call reports. The caregiver application also may receive notifications via push/SMS/email for specific important events in some embodiments of the present disclosure.

In an embodiment of the present disclosure, the caregiver application badge may be an icon on a smartphone application menu that allows the caregiver to launch the application. It may include a counter (red-circled number in upper right) showing the total number of new events configured through application settings. However, it should be appreciated that the badge may have other configurations or visual identifications without departing from the present disclosure.

Figure 3:
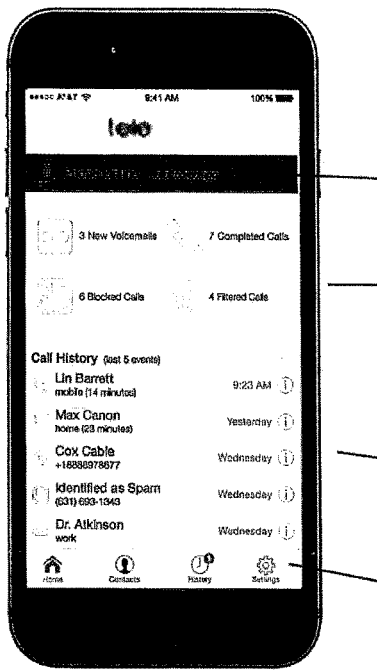
FIG. 3 depicts a view of a caregiver application according to an embodiment of the present disclosure.

The caregiver application may include a menu bar (FIG. 3) [C01] for quick navigation to key screens in an embodiment of the present disclosure. In other embodiments of the present disclosure, there could be a different menu design implemented based on usability. The caregiver application also may include a dashboard (home) screen that may show key status information (FIG. 3) [C02] at a glance. The application may further include a desk phone status block (FIG. 3) [C03] that may show desk phone connection status with a green/red/yellow background and time last checked. Touching this status block may send the caregiver to the hardware settings screen where additional hardware status details and configuration settings may be available. The application also may include a voicemail icon that may show a count of new voicemails available to the caregiver. It should be appreciated that other event icons may be included within the application including daily counts of relevant events including, but not limited to, completed calls, blocked calls, unknown callers, and/or filtered calls. Selecting any of these status icons may send the caregiver to a history screen with the corresponding filter applied. The dashboard screen (FIG. 3) [C04] also may show a most recent events list. It should be appreciated that selecting any individual (i) icon may pop up a screen with further details of the selected event.

Figure 4:
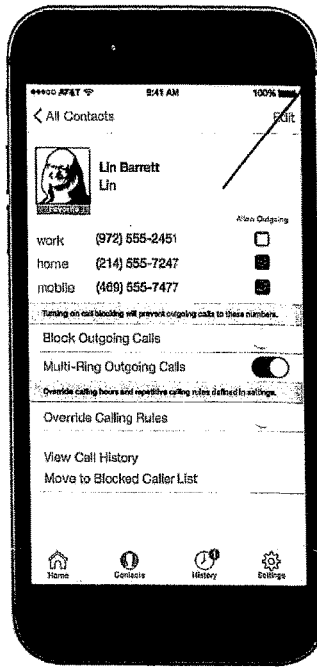
FIG. 4 depicts another view of a caregiver application according to an embodiment of the present disclosure.

Within the caregiver application, the account administrator may add contacts (FIG. 4) [D01] that are approved to call the desk phone user. A contact can be added using a smartphone's contact list or information can manually be entered in embodiments of the present disclosure. Information associated with a contact may include first name and last name (collectively known as full name), display name (a preferred name to be displayed on the desk phone during a call), a photo, one or more phone numbers, whether to allow outgoing calls, and whether to allow multi-ring outgoing calls. In terms of the information displayed, there may be embodiments of the present disclosure where the caller ID name and number may be displayed; however, there may be other embodiments of the present disclosure where the display name (i.e., "Uncle Mike") may be displayed instead of or in addition to the caller ID name and number. The caregiver also may view call history and filter to a specific contact; if the history screen is selected, the view may be sorted by most current event as well as other filter categories. The caregiver may move a contact's name and associated phone numbers to the personal call block list, and the caregiver also has the ability to delete a contact record after a confirmation. The caregiver also may create an exportable report of contacts that may be sent via email. A report request may be sent to the cloud service, and once completed, an email may be generated with a download link according to an embodiment of the present disclosure.

It should be appreciated that there may be different types of users of a caregiver application (app users) according to embodiments of the present disclosure. These app users may include account administrators and authorized users. The primary caregiver is typically considered to be the account administrator and may be the first person that created an account and registered the desk phone with the account. It should be appreciated that the account administrator may be provided with the sole authority to authorize new app users and remove app users. New app users may be invited through email or SMS and should be an existing contact within the caregiver application. One app user may be identified within the application as the primary caregiver. By default, this may be the account holder, but it can be changed by the account holder in embodiments of the present disclosure. The primary caregiver may be provided with a code that allows him/her to override the calling rules and have the desk phone user accept the call as if the caller-ID is that of the primary caregiver. This can be useful if the primary caregiver has to use an unfamiliar/unregistered phone number or the caller-ID is not properly transmitting to the desk phone.

Other features that may be configured using the caregiver application include the idle clock format, a selectable format for the clock display (example: "It is now Wednesday Afternoon"), the greeting (i.e., [It is now] is the default, but can be edited), the time of day format (i.e., "Afternoon," "Wednesday," "Wednesday Afternoon," "Wednesday Afternoon the $21^{st}$," "Wednesday, January $21^{st}$"), and the display color scheme (i.e., selection from defined text and background colors). The caregiver application also may include subscriptions/features where in-app purchases may be made.

If the caregiver application is launched by itself for the first time (i.e., caregiver not previously logged in), a Create Account tab may be be selected. If the application is launched from an invitation link (i.e., via email or SMS), then the Join Account tab may be selected. When setting up a new desk phone, the account holder may be prompted to enter the serial number or scan a QR code associated with the phone.

The desk phone may contain a collection of electronics, software and sensors which provide one or more features to the desk phone user. The desk phone also may act as a measurement and/or collection point for data which may be passed back to the cloud service and made available to the caregiver. A desk phone according to embodiments of the present disclosure may provide a simple, clean and uncluttered interface to minimize any confusion over the proper operation of the phone. Another objective may be to gather health and usage related data to change the behavior of the phone and features, as well as to provide feedback to the caregiver to increase peace of mind.

The desk phone may include a large dynamic display according to an embodiment of the present disclosure. The phone's large high resolution display may dynamically change to display relevant and helpful information to the desk phone user in response to the actions being performed at that particular moment. In some embodiments of the present disclosure, a large portion of the desk phone's face could be a large display similar to a tablet device. In some embodiments of the present disclosure, this display could be touch-sensitive, and all button appearance, size and location could be displayed on this display without departing from the present disclosure. However, there may be other embodiments where the display may not be touch-sensitive without departing from the present disclosure.

A desk phone according to embodiments of the present disclosure could have a solid cover plate made of plastic or other similarly sturdy material which may fasten into place on top of the large display of the desk phone. It should be appreciated that the desk phone may be manufactured with the cover plate on top of the display; however, there may be other embodiments where the cover plate may be attachable. It may further include transparent or semi-transparent keys or buttons that can physically be pressed. These keys also may allow the underlying image from the display to be visible. In some embodiments of the present disclosure, one or more keys could activate a defined hot-spot area on the display, and when pressed, a specified action may take place. It should be appreciated that the keys could be electrically connected within the cover plate and act as a switch when pressed in an embodiment of the present disclosure. In this embodiment, the cover plate may communicate the key actions via an electrical or wireless connection to the desk phone. In some embodiments of the present disclosure, the desk phone may include a section of the face plate that may tilt along an axis and alter all or part of the large display's angle of view to improve readability. In other embodiments of the present disclosure, the desk phone could contain two separate displays so that one display may be tilted on an axis for easy readability at other viewing angles, such as when the desk phone user is lying in bed.

Figure 2:
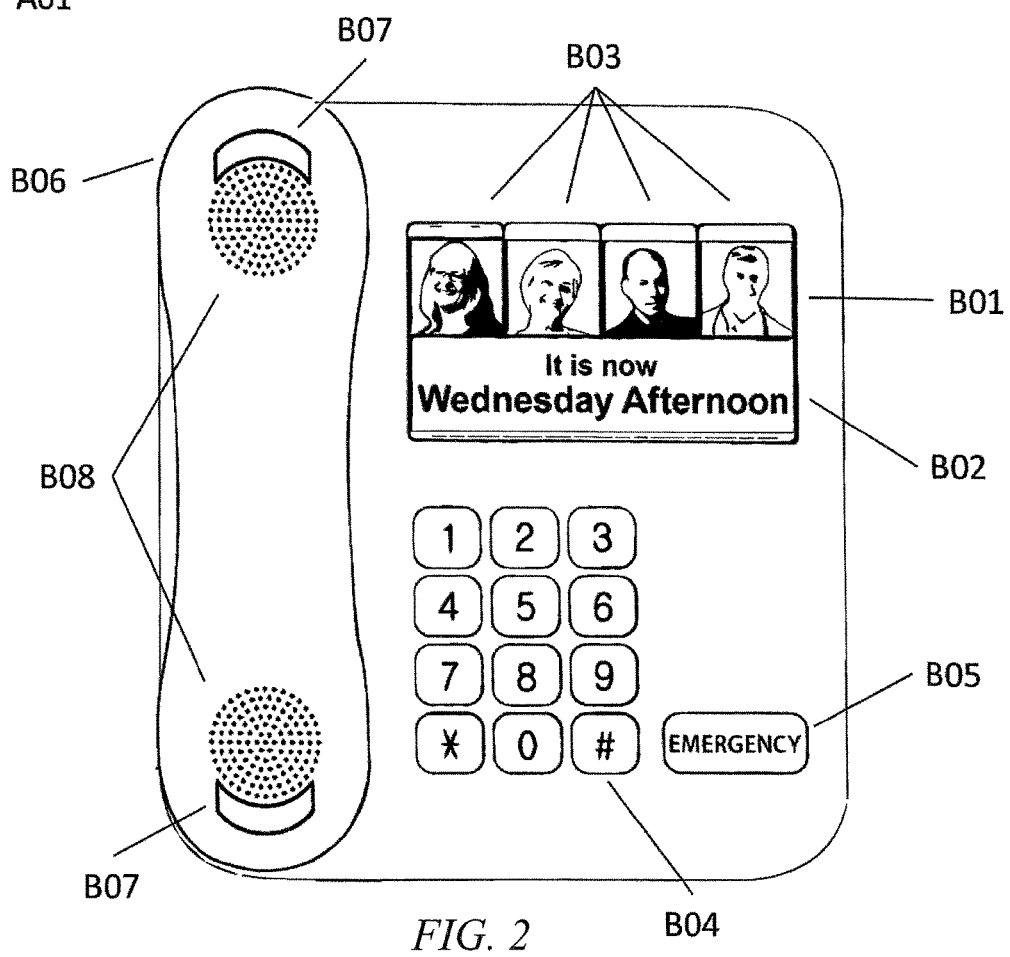
FIG. 2 depicts a desk phone according to an embodiment of the present disclosure.

The display may include one or more sections. In an embodiment of the present disclosure, the display may be divided into a quick-dial section (FIG. 2) [B01] on a top portion and an information section (FIG. 2) [B02] on a bottom portion. While the orientation of the sections has been described, it should be appreciated that the orientation may change without departing from the present disclosure. In an embodiment of the present disclosure, a top section of the display of a desk phone may include one or more quick-dial photos covered with a similar number of equal-sized clear plastic push buttons (FIG. 2) [B03]. For example, there may be four photos and four push buttons. In embodiments of the present disclosure, these photos (or text) and their corresponding phone numbers may be managed by the caregiver application (FIG. 1) [A02]. While the examples described herein show a specific number of buttons and their layout, this is merely for descriptive purposes. There may be more or less than four quick-dial buttons. The buttons also may vary in size and shape and may cover more than one row in embodiments of the present disclosure. The one or more quick-dial buttons may be setup via the caregiver application and can display a photo, text or both photo and text. Pressing a quick-dial button when placing an outgoing call may verify that quiet hours are not active, dim other quick-dial buttons, and/or update the information display to show that the number is being dialed (i.e., "Calling Lin").

In an embodiment of the present disclosure, a bottom section of a display of a desk phone may display event-related information. When idle, an Alzheimer's clock or other custom message can be displayed. During incoming/outgoing calls, simplified caller information may be displayed. However, more, less or other information may be displayed without departing from the present disclosure. It also should be appreciated that the information section could be larger or smaller, appear above, below or in a separate area from the quick-dial section, and could be made up of additional buttons similar to the quick-dial section without departing from the present disclosure.

Caller information may be displayed on the desk phone in embodiments of the present disclosure. During an incoming call, the information section of the dynamic display may flash between two contrasting colors while showing the caller's information, and may include a picture associated with the caller, if available. Once the call is answered, the display may stop flashing but may continue to show caller information until the call is disconnected. When placing an outgoing call, the information section of the dynamic display may show the phone number being entered, unless a quick-dial button has been pushed. If the number being dialed matches a contact, then the contact information may be shown, including a picture of the contact, if available. It also should be appreciated that there may be embodiments where partial phone numbers or old phone numbers may cross-reference to a contact when the desk phone user attempts to dial a phone number. When desk phone is idle, the clock may be displayed using a style as defined in the caregiver application settings.

The desk phone according to embodiments of the present disclosure may include an oversized dial keypad (FIG. 2) [B04] that may make it easier for a desk phone user to press the right numbers, for example, when making a call. The keypad may cleanly display the numbers and limit extra information or functions on the keypad that could cause confusion for the desk phone user. The keypad may include opaque buttons with printed lettering or may be transparent keys displaying an image from below according to embodiments of the present disclosure.

In an embodiment of the present disclosure, a caregiver-definable button (FIG. 2) [B05] may provide for programmable sequences to be triggered when pressed, including but not limited to, placing simultaneous calls, texts, and/or push notifications to one or more pre-defined emergency contacts. This emergency button could be opaque with pre-printed lettering or could be transparent allowing for an image to show through from either other pre-printed material with or without backlighting or from a LCD or other digital panel in embodiments of the present disclosure. In other embodiments of the present disclosure, the emergency button could control one or more other non-emergency features, including but not limited to, an external light control device.

A motion detection sensor according to an embodiment of the present disclosure may be integrated with or operate in conjunction with the desk phone to trigger programmed events, including, but not limited to, logging time, date and duration events to the cloud service, automatically turning on/off/dimming room lighting during the night, and/or modifying the display brightness on the desk phone or the information displayed.

In some embodiments of the present disclosure, a wireless handset (FIG. 2) [B06] may connect to the desk phone via Bluetooth or other means. In other embodiments of the present disclosure, a wired handset can be used. If a wireless handset is utilized, it should be appreciated that the handset may charge while in the cradle. A handset according to embodiments of the present disclosure may contain one or more sensors including, but not limited to, an accelerometer, orientation and motion sensors, infrared and other heat sensors, galvanic skin response sensors, heartbeat sensors, and light sensors.

Figure 5:
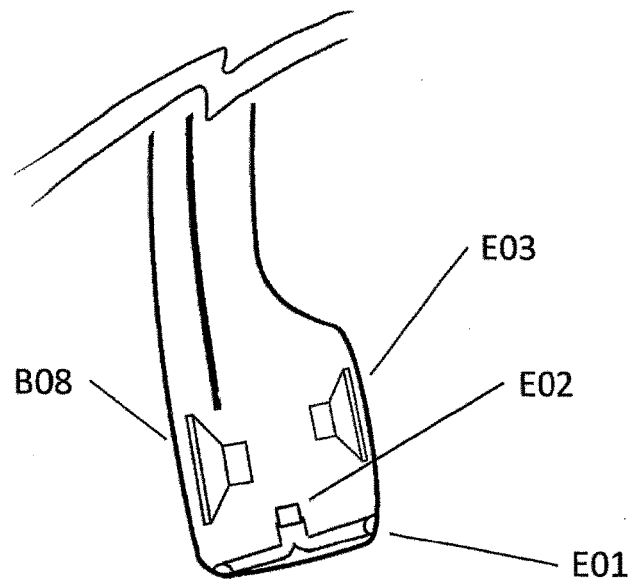
FIG. 5 depicts a portion of a handset of a desk phone according to an embodiment of the present disclosure.

It should be appreciated that there may be no top or bottom orientation for the handset in embodiments of the present disclosure. Both ends of the handset may include both an earpiece speaker (FIG. 5) [E03] and a microphone (FIG. 5) [E02]. The microphone may incorporate an audio pathway (FIG. 5) [E01] that may direct incoming audio from both the front and the back for versatility in normal and speaker phone mode. Using motion sensors, other sensors and/or a combination of multiple sensors and intelligent programming, the handset may determinate which end of the handset is closest to the impaired individual's ear and then may activate the proper speaker/microphone accordingly.

An accelerometer and gyroscope circuit may determine motion and orientation for the handset and then adjust the ear/mouthpiece functionality based on the orientation of the handset when use. Additionally, sensors may be placed on the handset grip that may sense if it is being held in a desk phone user's hand; these sensors could be on top of the handset, the bottom of the handset or on both top and bottom according to embodiments of the present disclosure. A galvanic skin response measurement may identify if a bare hand is holding the handset.

One or more speakers (FIGS. 2, 5) [B08] on the back of the handset may act as the speaker phone audio output. These speakers may also act as wireless speaker output for music playback controlled by the desk phone in some embodiments of the present disclosure. There may be one or more buttons on the back of the handset that may function to turn on/off speaker phone functionality and to answer incoming calls (FIG. 2) [B07]. In some embodiments of the present disclosure, the speaker phone functionality may be able to activate automatically when the handset is placed on a surface during a call. Buttons on the handset may flash or otherwise activate in a programmed sequence when certain activities occur such as when an incoming call rings, when the "Find Handset" feature is activated (i.e. a button in the cradle of the desk phone to help locate a lost handset), when playing audio out of the rear speakers, or other defined scenarios. It should be appreciated that a "Find Handset" button may not be visible when the handset is resting in the cradle. There may be an audible hang-up reminder through the speaker phone when a call has ended but he handset is laid down away from its cradle in some embodiments of the present disclosure.

The handset could be set to vibrate on incoming calls and other alert notifications in some embodiments of the present disclosure. Sensors in the earpiece on the top and bottom ends of a handset according to embodiments of the present disclosure could deactivate the speaker phone on the handset when the handset is brought to the desk phone user's ear. As a desk phone user talks on the phone using the handset pressed against his/her face, sensors could measure the desk phone user's temperature at the ear and near the mouth. Additional sensors could be in the handset to measure temperature and pulse. In some embodiments of the present disclosure, the handset may include volume control, volume leveling, sound amplifier and/or active noise reduction. There may be other embodiments where these features/functionalities may be controlled via the cloud service.

In embodiments of the present disclosure, a desk phone's software programs, feature sets, rules, contacts list and block lists could be stored locally on the device, and in other embodiments of the present disclosure, all or a portion of these functions could be stored using a cloud service. Some of the rules may be processed and decisions may be selectively made locally on the device and/or on the cloud service. Updates may be automatically downloaded to the desk phone in embodiments of the present disclosure, and all transaction and measurement data may be uploaded to the cloud service in other embodiments of the present disclosure.

A contacts list according to embodiments of the present disclosure may include a list of contacts that are approved to call the desk phone user. The list can contain multiple phone numbers per contact. Each phone number can be restricted to "incoming only" in embodiments of the present disclosure. It should be appreciated that each entry in a contacts list can include a photo associated with a specific person. There may be embodiments of the present disclosure that may identify if multi-ring is permitted for a specific contact on outgoing calls. If multi-ring is activated, all authorized outgoing numbers for that contact may be called simultaneously and the first number to be successfully answered will be the line connected with the desk phone user. This could require the answering party to press a "1" to complete the call, which would prevent caller from being connected with voicemail. There also may be embodiments that may identify if incoming and/or outgoing rules should be overridden for a specific contact. If enabled through the caregiver application, pressing and holding the [*]+[#] keys may activate the override and allow an outgoing call to be placed overriding all rules and block lists; however, other keys may be pressed to activate the override without departing from the present disclosure.

Various block lists may be employed according to embodiments of the present disclosure depending on the needs of the desk phone user and/or caregiver. During an incoming call, the caller-ID may be compared first against the contacts associated with the desk phone. If the caller-ID is not found, then the caller-ID may be compared with one or more block lists, such as personal and subscribed block lists. During an outgoing call, the number being dialed may be compared against all block lists. Several block lists may be provided.

In an embodiment of the present disclosure, a personal call block list may be a list created by account administrators. All application user levels may browse this scrollable list of names and phone numbers and/or search the list by name or phone number. It should be appreciated that names may be duplicated within the list, but phone numbers are considered unique to all block lists and contacts. It may be applicable for both incoming and outgoing calls, and it may start out empty but be edited as needed. New records may be added by an account administrator manually, from the call history, and/or from the contacts list. Existing records can be edited, deleted or moved to contacts by an account administrator.

A subscribed block list according to an embodiment of the present disclosure may be a subscription-based list of known telemarketers, spammers and robocallers. This list also may be applicable for both incoming and outgoing calls. Account administrators and authorized users may have the same rights as they do for the personal call block list.

An outgoing call block list according to an embodiment of the present disclosure may be a list created and updated automatically based on selections within the contact records associated with the desk phone user. These may be contacts that are approved to call the desk phone user; however, the desk phone user may be restricted from placing an outgoing call to the specific phone number in some embodiments of the present disclosure. As with other block lists, desk phone users can browse and search this list; however, none of the records may be editable. Editing should be performed through the contact records. While a number of block lists have been described, it should be appreciated that more or fewer block lists may be provided without departing from the present disclosure.

Various rules may be configured for incoming and outgoing calls, and they may be applicable to all calls not associated with a block list. One rule may set quiet hours for incoming calls such that incoming calls that would ordinarily be allowed but occur between certain specified hours will automatically forward to voicemail. Another rule may set quiet hours for outgoing calls in which outgoing calls that would ordinarily be allowed but occur between certain specified hours may be handled based on several sub-rules.

For example, with "ring no answer", the desk phone may simulate the call going through and ring with no answer. Another sub-rule may be simulated voicemail wherein the desk phone may simulate the call going through and ringing, but followed by a special voicemail message. The voicemail may then be uploaded to the cloud service. Another example is "message to user" where the desk phone will not allow the call to be completed and will play a special message for the desk phone user. A routine may be specified for repeated dialing that triggers, for example, when a specified number of completed outgoing calls are placed to the same number in a rolling 15-minute period. If this occurs, the caregiver may specify which one of the sub-rules should be employed. Another sub-rule that may be employed is to forward the call to the primary caregiver. Other rules that may be configured according to embodiments of the present disclosure include whether to allow outgoing calls to unknown numbers, all incoming calls from unknown numbers, allow incoming calls having no caller-ID.

One or more incoming call rules may be provided in embodiments of the present disclosure. For incoming calls, after a caller-ID passes the blocked rules comparison, then the caller-ID may evaluated against one or more rules. If the caller has no caller-ID and application of the rule "Allow Incoming Calls from No Caller ID" results in [No], then the call may be sent to voicemail. If the caller is an unknown caller and application of the rule "Allow Incoming Calls from Unknown Numbers" results in is [No], then the call may be sent to voicemail. If the caller is an approved caller and application of the rule "Override Calling Rules" results in [Yes] within a contact record, then the remaining rules may be disregarded and the call may be completed. If the call is made during incoming call quiet hours, then the call may be sent to voicemail. While several incoming call rules have been described, it should be appreciated that more or fewer rules may be provided without departing from the present disclosure.

One or more outgoing call rules may be provided in embodiments of the present disclosure. For outgoing calls, once the dialed number passes the blocked rules comparison, then the number may be evaluated against one or more outgoing call rules. If the caller is unknown and application of the rule "Allow Outgoing Calls to Unknown Numbers" results in [No], then the call may be sent to simulated voicemail. If the caller is approved and application of the rule "Override Calling Rules" results in [Yes] within a contact record, then the remaining rules may be ignored and the call may be completed. If the call is during outgoing call quiet hours, then the call may be processed based on an outgoing call quiet hours setting: [Ring No Answer/Simulated Voicemail/Message to User/Forward to Primary Caregiver]. If the times of repeated dialing are greater than a specified number of calls, then the call may be processed based on repeating dialing action. While several outgoing call rules have been described, it should be appreciated that more or fewer rules may be provided without departing from the present disclosure.

Based on the settings associated with a desk phone according to embodiments of the present disclosure, calls can be forwarded to voicemail for various reasons including, but not limited to, no answer, no caller-ID, unknown caller, and call made during quiet hours. There also may some embodiments of the present disclosure where calls are not forwarded to voicemail, such as when a caller is on a block list. It should be appreciated that all voicemails may reside on the cloud service and notifications may be sent to the caregiver application. When new voicemail messages are available for the caregiver, the counter may increase on the dashboard and on the badge of the caregiver application. Voicemail messages may reside in the cloud service and may be streamed to the caregiver application when played. The desk phone may not include a visible voicemail notification and may be unable to retrieve voicemail. Rather, all voicemail setup may occur through the caregiver application. There may be embodiments where attempts may be made to deliver a voicemail to the desk phone user by periodically ringing the desk phone and then playing the voicemail when the desk phone is answered.

While not visible via the desk phone, transactional records of all calls may be tracked in the cloud service according to embodiments of the present disclosure. Transaction records may be maintained of information including, but not limited to, incoming/outgoing calls, caller-ID/dialed number, date/time, call duration, and completed/blocked/ rule exception. In some embodiments of the present disclosure, call recordings may be maintained.

The caregiver may specify whether to receive notifications, such as in response to the above-described rules, through push notification, email and/or SMS. The caregiver also may specify whether he/she wishes to receive automatic updates, allow dial pad override, and whether a button must be selected to connect multi-ring calls. If a button must be selected, when a person answers one of the multi-ring calls, he/she may receive a voice prompt and must press the button on his/her telephone keypad to be connected to the caller (desk phone user). If no button must be selected, the call may be connected to the first number that answers, even if answered by a voicemail system.

Incoming calls can be answered by picking up the handset or pressing a speaker phone button. The handset does not have to be in the desk phone cradle when a call is to be answered as sensors within the handset can determine that the call is being answered. It should be appreciated that the system may specify one or more types of incoming callers including, but not limited to, approved (i.e., caller is known and is a member of a contacts list previously defined by an account administrator), blocked (i.e., caller is known and (1) has been placed on a personal call block list by an account administrator or (2) is on a subscribed blocked list), and unknown (i.e., called does not have a caller-ID, is not in a contacts list, or is not on a block list). When a new call comes in, the caller type may be determined based upon the caller-ID; the rules may be processed and a decision may be made whether the call is allowed to complete, should be sent to voicemail, or should be rejected. If the call is allowed to be completed, the desk phone may ring and the display may be updated in one or more of the following manners: information section of display may display caller information (i.e., full name, display name, and/or photo) and flash between two contrasting colors, and photos in quick-dial section of display may dim to reduce confusion for the desk phone user. If the call is to be sent to voicemail, the phone will not ring and the caller will be prompted to leave a voicemail. The voicemail may then be uploaded to the cloud service. If the call is rejected, the phone will not ring and a rejection message will be played for the caller before the call is disconnected.

When an outgoing call is to be placed, there may be several types of outgoing callers including, but not limited to, approved (i.e., the number is known and part of contacts list previously defined by an account administrator), blocked (i.e., the number is known and (1) has been placed on personal call block list by an account administrator or (2) is on a subscribed block list or (3) is on the outgoing call block list), and unknown (i.e., the number is not in a contacts list or on any block lists). When the number is dialed, the caller type is determined; the rules associated with the caller type may be processed and a decision may be made whether the call is allowed to complete or another action should be taken based on caregiver application settings.

To end a call, the handset may be placed in the cradle. If a call is terminated before the handset is placed in the cradle, the desk phone may disconnect the call and the handset will go into stand-by mode in an embodiment of the present disclosure. If a call has been ended and the handset is not placed in the cradle, there may be an audible hang-up reminder transmitted through the speaker phone to prompt the desk phone user to place the handset in the cradle.

Turning to the cloud service according to embodiments of the present disclosure, initial account creation may occur when the primary caregiver first creates an account online or within the caregiver application, signs up for service and registers at least one desk Phone. This app user may become the account holder and the administrator in an embodiment of the present disclosure. It should be appreciated that only the account holder can add administrator users and desk phones, while administrators can add app users. All new app users must be invited. It should be appreciated that a single cloud service account may have a plurality of desk phones assigned to it, but each desk phone must have the same settings. Only the account holder can view/edit subscription information and add/remove features. Only administrators may change the settings to the desk phone set up and/or quick-dial buttons, and only administrators can request export reports. When changes/updates are made within the caregiver application, they are updated in the cloud service and then propagated to other associated caregiver applications and desk phones in embodiments of the present disclosure. It should be appreciated that the features and rules processing previously described with respect to the caregiver application and/or desk phone may be performed in the cloud, with the results passed along to the desk phone, in an embodiment of the present disclosure. It should be appreciated that there may be embodiments of the present disclosure wherein an administrator in an assisted living center, for example, may be provided with certain credentials to manage various desk phone users and/or various app users.

The cloud service according to embodiments of the present disclosure may include transaction/event logs. It should be appreciated that all events may be considered transactions that are viewable within a history screen. Any event log entries created may be automatically communicated to the caregiver application, which can trigger notifications within the application based on settings. Events may include desk phone software update events (i.e., update available, update installed successfully, update failed), caregiver application software update events (i.e., update installed via AppStore), and desk phone statuses (i.e., online, offline, rebooted).

Desk phone software updates can occur automatically or on-demand based on a caregiver's selection in the caregiver application. If the update may require the phone to restart, the caregiver may be required to initiate the update regardless the settings employed. When an update is available and waiting for the caregiver to provide authorization, an event log entry may be generated and pushed to the caregiver application, the caregiver application's desk phone status block may change to yellow, and/or a notification may be sent to the caregiver application to increase the caregiver badge counter. When updating the desk phone, the software update may be downloaded and installed by the cloud service via cellular data connection in the background. Upon execution, transaction log entries may be generated as required. Upon completion, an event log entry may be generated showing success or failure. If successful, the caregiver application's desk phone status block may change to green.

Transactions are considered to be more detailed logs containing all events and lower level transactions not visible from the caregiver application. They can be used for advance reporting, statistical analysis and troubleshooting in embodiments of the present disclosure.

Various reports can be ordered via the caregiver application. Once prepared, an email may be generated with a download link and sent to the caregiver through the cloud service. It should be appreciated that call history information may be updated live with the cloud service. The cloud service may regularly poll the desk phone checking if it is online or if it is disconnected due to loss of power, network outage, or other malfunctions. The cloud service may notify the caregiver if a problem exists.

Other features of the system may include the ability for the desk phone to be forced to answer remotely through use of the caregiver application or by selecting an intercom feature. This may allow a caregiver to activate the speaker phone of the desk phone to talk to care-receiver. The desk phone also may act as a Wi-Fi hotspot which may be great for Kindle, iPad or other connected accessories designed to work in connection with the desk phone. Using the desk phone's Wi-Fi, Bluetooth or other wireless connection technologies, the desk phone can act as a wireless hub for medical and convenience devices, which could include, but are not limited to: fall detector/emergency pendant, activity/heart monitor, blood pressure device, digital scale, medication monitor, motion detector, video/audio monitor, light controls, wireless-enabled door locks, motion detector, and bed monitor devices.

In some embodiments of the present disclosure, functionality may be provided for paid caregivers from home care companies to clock-in and clock-out when they arrive/leave an impaired individual's home by either entering a code on the phone's keypad or calling a specified number and entering a code. This may result in notification to both a family caregiver and the employer of the home care company.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A cloud service-based telephone system for a caregiver to remotely manage an impaired individual, the system comprising:

at least one desk phone associated with the impaired individual, the at least one desk phone having an uncluttered interface to simplify use of the at least one desk phone by the impaired individual and wherein the at least one desk phone is selected from the group comprising a desk phone, a handset and a base unit, and a speakerphone; and at least one caregiver monitoring application external to the at least one desk phone that communicates with the at least one desk phone over the cloud service through one or more of the following: a cellular network, a Wi-Fi network, a Bluetooth connection, and a wired connection to remotely selectively identify one or more functionalities for the at least one desk phone and remotely change available functionality of the at least one desk phone, and wherein the cloud service contains a set of rules, database lists and available user features that permit the caregiver, using the at least one caregiver monitoring application, to both remotely provide and limit the one or more functionalities of the at least one desk phone in a customized manner to match cognitive capabilities of the impaired individual; wherein the at least one desk phone includes a wireless communication technology that transforms the at least one desk phone into a hub to communicate with one or more devices within a defined perimeter of the at least one desk phone, the one or more devices selected from the group comprising: fall detector/emergency pendants and wristbands, activity/heart monitors and wristbands, GPS tracking devices, medication monitors, video/audio monitors, motion detectors, light controls, electronic or wireless-enabled door locks, house lighting, bed monitors, cameras, motion sensors, scales, heartbeat sensors, galvanic skin response sensors, and blood pressure monitors.

2. The telephone system of claim 1 wherein the at least one caregiver monitoring application is a web application.

3. The telephone system of claim 1 wherein the at least one caregiver monitoring application is a smartphone application.

4. The telephone system of claim 1 wherein the at least one desk phone collects data for the at least one caregiver application, wherein the data is collected by the at least one desk phone through sensors or cameras, the sensors selected from the group comprising: an accelerometer, orientation and motion sensors, infrared and other heat sensors, galvanic skin response sensors, heartbeat sensors, and light sensors.

5. The telephone system of claim 1 further comprising:
a wireless handset having at least one earpiece speaker and at least one microphone, wherein the wireless handset is in direct communication with the at least one desk phone to relay communications to and from the impaired individual.

6. The telephone system of claim 5 wherein each end of the wireless handset has an earpiece speaker and a microphone.

7. The telephone system of claim 6 wherein the wireless handset includes at least one sensor to determine which end is closest to the impaired individual's ear to activate the proper speaker and microphone combination.

8. The telephone system of claim 7 wherein the at least one sensor is placed on a grip of the wireless handset to sense if the wireless handset is being held in a hand of the impaired individual, and wherein the at least one sensor is on a top portion of the wireless handset, a bottom portion of the wireless handset, or on both.

9. The telephone system of claim 1 wherein the at least one desk phone includes a large display.

10. The telephone system of claim 9 where the large display includes a plurality of transparent buttons associated with switches.

11. The telephone system of claim 9 wherein the large display includes a cover plate and a plurality of transparent buttons overlaid on the large display, the plurality of transparent buttons having an undersurface conducive to interaction with a touch panel of the large display when depressed.

12. The telephone system of claim 9 wherein the large display includes at least one quick-dial button, wherein the at least one quick-dial button is associated with at least one phone number and displays a photo or text associated with the at least one phone number.

13. The telephone system of claim 9 wherein the large display includes an information section, wherein the information section digitally displays an identification of a caller and time of call.

14. The telephone system of claim 1 wherein, using one or more sensors, the at least one desk phone monitors activities within a defined perimeter of the at least one desk phone and reports the activities to the at least one caregiver application via the cloud service.

* * * * *